J. K. O'NEIL.
Spring Balance.

No. 54,941.

Patented May 22, 1866.

Witnesses:
J. B. Woodruff
Marshall Taylor

Inventor:
John K. O'Neil

UNITED STATES PATENT OFFICE.

JOHN K. O'NEIL, OF KINGSTON, NEW YORK.

IMPROVEMENT IN SPRING-BALANCES.

Specification forming part of Letters Patent No. 54,941, dated May 22, 1866.

*To all whom it may concern:*

Be it known that I, JOHN K. O'NEIL, of Kingston, in the county of Ulster, in the State of New York, have invented a certain new and useful Adjustable Concentrated Spring-Balance for Weighing; and I do hereby declare that the following is a clear, full, and exact description of the same, reference being had to the accompanying drawings, making a part of this specification, in which—

Figure 1:
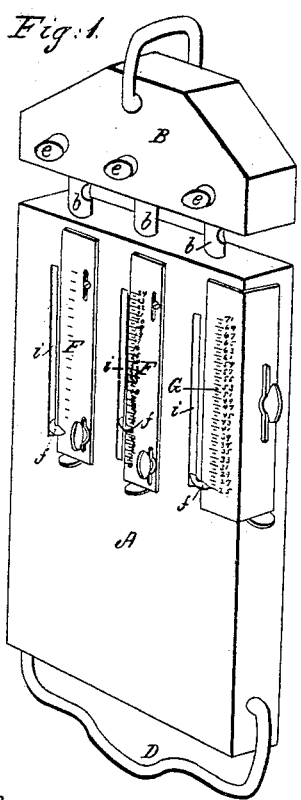
Figure 2:
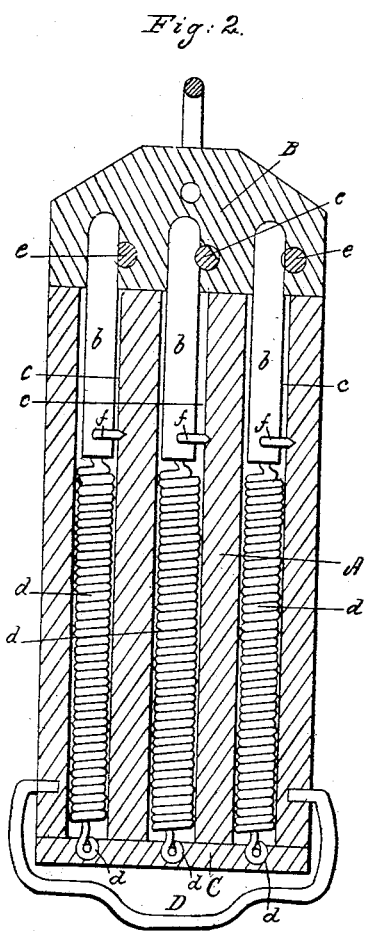
Figure 3:
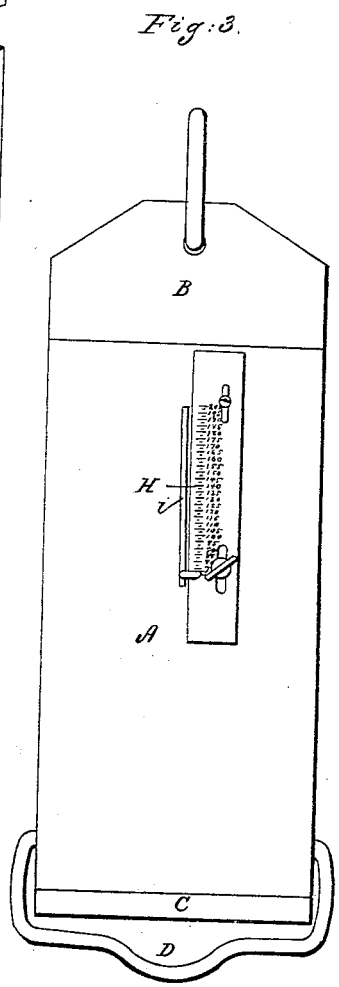

Figure 1 represents a perspective view of the weighing-instrument. Fig. 2 shows a section through the springs and internal arrangement for connecting and disconnecting for use. Fig. 3 shows the reverse side and scale for the maximum weight.

The object of my invention is to produce a weighing-instrument that, while it indicates fractional parts of a pound, has the capacity of three separate single scales or weighing devices.

My invention consists in so arranging three separate springs that they may be used separately or conjointly. First, the fractional parts of a pound may be indicated by coupling the middle spring to the suspension-block, while the two outside ones are detached; secondly, a heavier weight may be determined by attaching the two outside ones and detaching the center spring; thirdly, a weight three times the amount of the first given may be determined by attaching all three of the springs to the suspension-block.

To enable others skilled in the art to make and use my invention, I will describe it more in detail, referring to the drawings and to the letters marked thereon.

The case A may be made of hard wood or of metal of sufficient length, width, and thickness to contain the three springs $a\ a\ a$, with their coupling-rods $b\ b\ b$, they being fitted in recesses or grooves $c\ c\ c$, so as to keep in their proper position and allow the springs to operate freely. The springs $a\ a\ a$ being hitched to the base-piece C by having eyes and pins $d\ d\ d$ in the ordinary manner, the weight or thing to be weighed is hitched to and suspended by the stirrup D, which is pivoted near to the bottom of the case A.

The coupling-rods $b\ b\ b$, to which the upper ends of the springs $a\ a\ a$ are attached, extend up out of the recess $c\ c\ c$ a sufficient distance to allow them to be coupled to the suspension-block B. This may be effected by the turning of the pins or keys $e\ e\ e$, put into the suspension-block, so as to operate in a notch in one side of the rods $b\ b\ b$, thus making a quick and sure fastening, which are easily operated to detach the rods by turning them half-way round, so that the flat side will allow the rod to pass freely by it. To the lower ends of the rods $b\ b\ b$ are the pointers $f\ f\ f$, working in slits or elongated openings $i\ i\ i\ i$, made parallel with the rods in the case A.

The graduated scales E F G H are made so that they can be moved down or up, and placed and held by thumb-screws $h\ h\ h$ in such a position on the case A that any surplus weight, such as a scoop, a platform, a basket, or anything for holding an article or any substance to be weighed, can be balanced so that only the article desired to be weighed will be indicated on the scale.

Having thus described my invention, what I claim as new, and desire to secure by Letters Patent, is—

The arrangement of any desired number of springs so that by detaching or attaching they may be used either separately or conjointly for a weighing-instrument, substantially in the manner herein described, for the purposes set forth.

JOHN K. O'NEIL.

Witnesses:
J. B. WOODRUFF,
MARSHALL TAYLOR.